May 17, 1955
K. RÖNSCH
2,708,708
ELECTRICALLY HEATED BAKING AND ROASTING UTENSIL
Filed Jan. 25, 1954
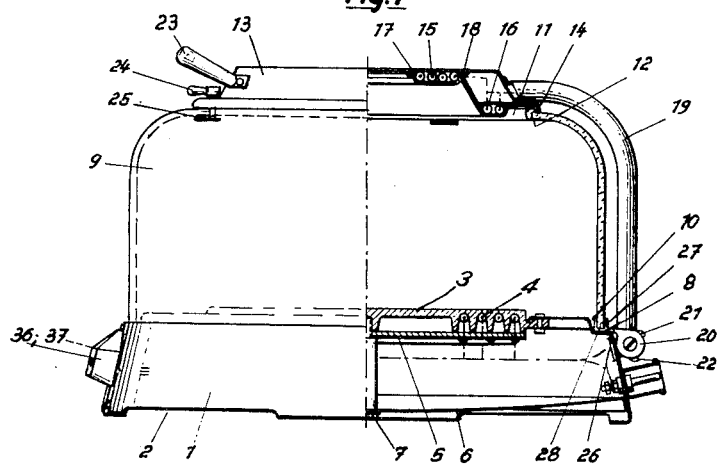
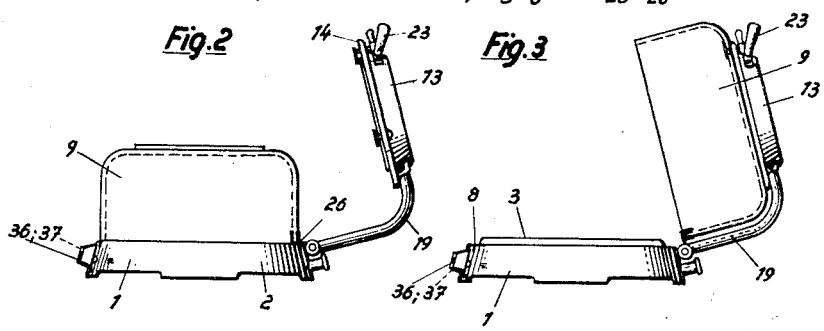
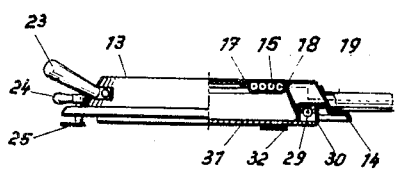
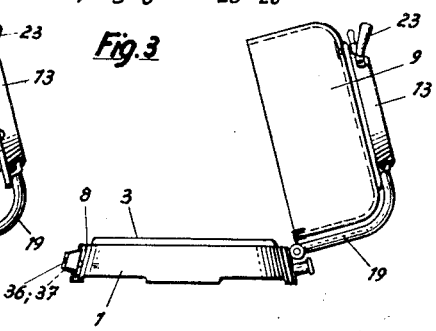
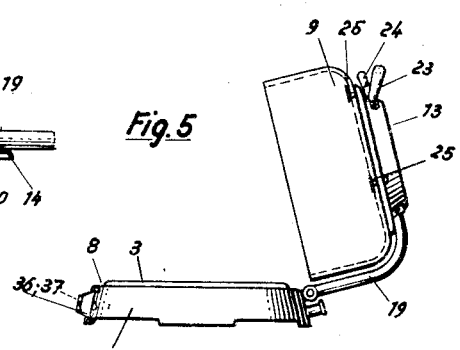
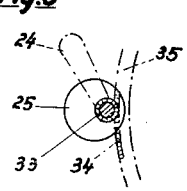
INVENTOR.
Kurt Rönsch.
BY
Attorney

United States Patent Office 2,708,708
Patented May 17, 1955

2,708,708

ELECTRICALLY HEATED BAKING AND ROASTING UTENSIL

Kurt Rönsch, Dresden, Germany

Application January 25, 1954, Serial No. 405,943

6 Claims. (Cl. 219—35)

This invention relates to an electrically heated baking and roasting utensil particularly intended and suited for household use.

The known utensils of this class representing a great variety of constructions are usually equipped with a hood the interior of which can be heated to the required temperature by suitable electrical means. In order to adapt the heat prevailing inside the hood to the requirements of a particular food to be treated therein the utensils are provided with heating aggregates both in their top and bottom portions for generating heat from above as well as from below, the amount of heat being regulated by step switches.

Owing to this arrangement, the known types of utensils can be used for baking, roasting and warming and are expected to meet numerous diversified demands in a satisfactory manner. They do this with respect to the distribution and intensity of heat, but they disclose some disadvantages which cannot be overlooked. One of these disadvantages is that a baking or roasting process cannot be directly observed and as to its intensity and duration users must solely depend on empirical values. Opening of the utensil, especially during baking, is not advisable, because the cold air entering would have an unfavorable effect. A further objection is that the cover or hood can be lifted off only with difficulty, since the parts to be separated radiate such heat that even heat-insulated handles frequently fail to be of assistance. This trouble is partly due to the fact that the cover or hood is tightly seated on the bottom part of the utensil to avoid thermal losses and adheres so firmly thereto, owing to partly unequal thermal expansion during baking or roasting, that it can often be lifted only with the aid of a tool.

It is the object of the invention to eliminate these disadvantages and to reduce thermal losses to a minimum so that less electric energy is needed for the same output.

The utensil according to the invention, equipped in known manner with a cover and a bottom heating aggregate, is fitted with a fireproof transparent hood having a low thermal coefficient of expansion. Both the hood and the cover are movable about a horizontal axis relative to the bottom part, the hood resting on a correspondingly shaped flange of the lower part of the utensil and the cover provided with a heating aggregate sealing an opening in the top of the hood. Suitable locking means permit connection of the hood and the cover.

By means of a bow-shaped member partly encircling the hood the cover is articulated to the base of the utensil and can thus be readily turned. Owing to the provision of locking means between the cover and the hood, the latter together with the cover may be raised to render the inner space accessible. Apart from its easy operability, this arrangement affords the advantage of requiring no extra space for the hood as do older types with removable hoods. The base of applicant's utensil when opened remains stationary, and the food contained therein is not in any way affected.

A baking or roasting process can be continually observed through the hood. While the known bright metal hoods caused the loss of much heat energy through outward radiation, the glass hood according to the invention considerably reduces this loss.

In a particularly suitable embodiment of the invention the top heat producer comprises two separately controllable ring windings the inner one of which is slightly raised and positioned directly below an attachable plate on which pots, etc. may be piled, and the other winding is arranged somewhat below the first and approximately on a level with the cover for the hood. Annular grooves in the plate serve for receiving and holding the inner heating coils.

By way of example, the invention is illustrated in the accompanying drawing, wherein:

Figure 1 is a side view of the utensil, partly in section;

Fig. 2, a side view thereof with the top heat producer turned back;

Fig. 3, a side view thereof with both the top heat producer and the glass hood turned back;

Fig. 4, a side view of the cover for infrared top heat;

Fig. 5 shows a modified form of locking the hood and the cover which are both turned back; and Fig. 6 is a detail view of the locking shown in Fig. 5.

In an upwardly tapering base 1, preferably provided with two recessed portions 2 for greater stability, a bottom heating plate 3 supports heating coils 4 arranged for edge ring heating which, compared with other ways of placing the coils, insures fore favorable radiation conditions. Below the plate 3 a covering plate 5 and a reflector 6 are secured by means of a holding member 7 to avoid downward radiation.

The base 1 possesses an annular offset portion 8 which is overlapped by the glass hood 9 and has a diameter smaller than the internal diameter of the hood 9 so that the annular space 10 permits expansion of the plate 3 and of structural parts exposed to heat without endangering the glass hood 9 or interfering with its turning.

In the top the glass hood 9 a concentric opening 11 limited by a flange 12 is formed upon which the top heat aggregate 13 rests by engaging the flange or bead 12 with its flange 14. The aggregate 13 has a flat upper side and is fitted with heating coils 15 for producing heat from above. It serves also as heat generator when cooking vessels or the like are piled up on its top. Additional heating coils 16 for producing heat from above are also provided in the aggregate 13 and like the coils 15 preferably arranged for ring heating. They may be jointly or separately connected or disconnected by suitable switches. The coils 15 are disposed between annular grooves 17, 18 of the top heat aggregate 13, which fix the coils laterally and also have a favorable effect during thermal expansion.

The top heat aggregate 13 forms the cover and is provided with a bow-shaped member 19 partly encircling the hood 9. The member 19 is movable about a horizontal axis and articulated to a joint 20 in the base 1. Stops 21, 22 provided on the member 19 and on the joint 20 limit the turning motion of the cover 13. The member 19 is hollow and holds the conductors for the top heat aggregate 13. A heat-insulated handle 23 on the cover 13 facilitates tilting.

In the edge of the aggregate 13 hand levers 24 are inserted whose eccentric discs 25 engage the bead 12 of the hood 9 and lock the latter and the cover 13. Around the joint 20 to which the member 19 is articulated a forklike member 26 is placed and, parallel to the axis of the joint, provided with U-shaped rails 27 adapted to the curvature of the hood 9 and taking up the lower edge 28 thereof.

Due to this locking and tilting arrangement, the cover or top heat aggregate 13 together with the hood 9 can be turned about the joint 20 to make the inner space accessible. The stops 21, 22 are so placed that the common center of gravity of the cover 13 and hood 9, when in turned-up position, lies somewhat laterally of the joint 20, so that the utensil is automatically held in this open position.

In the construction shown in Fig. 4 the top heat aggregate 13 is fitted with a coil 29 for infrared radiation. This coil is screened off from the inside of the hood 9 by a glass plate 31 fixed by flanges at 30. Suitable coil supports 32 insure satisfactory holding.

Figs. 5 and 6 show another way of locking the cover 13 and hood 9 or tilting the hood relative to the base 1. In this case, the top heat producer 13 is provided with hand levers 24 which with their eccentric discs 25 are supported by pins 33 and engage the bead 12 of the hood 9 from below. The members 24 are equidistantly distributed over the entire circumference, at least three of them displaced at an angle of 120° being provided to securely lock the hood and cover. In this construction the lower edge of the hood 9 need not be additionally secured.

For simultaneous actuation of all locking means 24, 25 by a single manipulation the pins 33 supporting the hand levers 24 and eccentric discs 25 are toothed and brought into positive interdependence by a cam 35 possessing teeth 34.

To regulate temperature or to connect or disconnect the utensil stepped switches 36, 37 are provided in the base 1. Infinitely variable regulating means as well as additional thermally operating safety switches, for instance of the bimetallic type, may also be used.

As indicated in Figs. 2, 3 and 5, the utensil can be opened by tilting only the cover (Fig. 2) when hood and cover are not locked or by turning both these members after locking them to permit free access to the inner space.

I claim:

1. Electric baking and roasting utensil for household use, comprising, in combination, a recessed base, a bottom heating plate in the base with its coils arranged in ring fashion to supply heat from below, a covering plate and a reflector secured below the heating plate to prevent downward radiation, a hood of fireproof transparent material possessing a low thermal coefficient of expansion, said hood having a central opening in its top and resting in an annular offset portion of the base to permit safe expansion of the heating plate and structural parts exposed to heat, a heating aggregate seated on and acting as cover for the opening of the hood and fitted with coils for supplying heat from above, a heat-insulated handle for the cover, a joint formed in the base, a bow-shaped hollow member supporting the cover and containing conductors for the top heating aggregate, said member partly encircling the hood and being articulated to the joint to enable it to carry out a turning movement to lift the cover from or return it to the hood, releasable locking means for the hood and cover permitting their joint movement by said bow-shaped member to provide free access to the inside of the hood and plugging connections for the utensil.

2. A utensil according to claim 1, in which a forklike member is arranged around the joint and the U-shaped rails thereof adapted to the curvature of the hood are engaged by the lower edge thereof.

3. A utensil according to claim 1, in which stops provided on the joint and the bow-shaped member limit the turning motion of the cover and automatically hold the hood and the cover in opened position by having their common center of gravity located slightly laterally of the joint.

4. A utensil according to claim 1, in which the releasable locking means comprise hand levers equidistantly disposed on the cover, toothed pins supporting the levers, eccentric discs arranged on said pins and engaging the bead of the hood from below and a toothed cam meshing with said toothed pins to effect positive connection of said levers.

5. A utensil according to claim 1, in which the top heat aggregate comprises two separately and jointly controllable ring windings and an attachable plate suited for heating a plurality of cooking vessels piled up thereon, the inner one of said ring windings being slightly raised and positioned directly below said plate and the other one being placed below the first one approximately on a level with the cover of the hood, said plate being annularly grooved for receiving and fixing the inner winding.

6. A utensil according to claim 1, in which a coil for infrared radiation is provided in the top heat aggregate and a fixed glass plate serves for screening off the coil from the inside of the hood.

References Cited in the file of this patent

UNITED STATES PATENTS

| | | |
|---|---|---|
| 2,135,318 | Barkinsky | Nov. 1, 1938 |
| 2,290,658 | Volks | July 21, 1942 |
| 2,430,582 | Reich | Nov. 11, 1947 |
| 2,622,187 | Welch | Dec. 16, 1952 |